United States Patent
Fang et al.

(10) Patent No.: US 9,135,730 B2
(45) Date of Patent: Sep. 15, 2015

(54) CURVE CHAIN CONNECTIONS UNDER SURFACE, DISTANCE, AND SHAPE CONSTRAINTS

(75) Inventors: Lian Fang, Irvine, CA (US); Show Tien Wang, Huntington Beach, CA (US); Feng Yu, Irvine, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 780 days.

(21) Appl. No.: 13/459,387

(22) Filed: Apr. 30, 2012

(65) Prior Publication Data

US 2013/0289946 A1 Oct. 31, 2013

(51) Int. Cl.
*G06F 17/50* (2006.01)
*G06T 11/20* (2006.01)
*G06T 17/30* (2006.01)

(52) U.S. Cl.
CPC ............... *G06T 11/203* (2013.01); *G06T 17/30* (2013.01)

(58) Field of Classification Search
CPC .............................. G06T 17/30; G06T 11/203
USPC ............................................................ 703/1
See application file for complete search history.

(56) References Cited

U.S. PATENT DOCUMENTS

| | | | |
|---|---|---|---|
| 6,256,039 B1 * | 7/2001 | Krishnamurthy | ............. 345/420 |
| 2004/0174362 A1 | 9/2004 | Celniker | |

OTHER PUBLICATIONS

Yi-Jun Yang et al. (An approximate computation of curves on B-spline surfaces (2007), 12 pages.*
Huaiping Yang et al. (A control point adjustment for B-spline curve approximation, (2004) 14 pages).*
Thomas W. Sederberg (Computer Aided Geometric Design, Chapter 7 (2007), 12 pages).*

* cited by examiner

*Primary Examiner* — Kamini S Shah
*Assistant Examiner* — Andre Pierre Louis

(57) ABSTRACT

Product data management systems, methods, and mediums. A method includes receiving a graphic model having a plurality of curves forming a curve chain and defining a distance threshold and angle threshold corresponding to the model. The method includes optimizing the curve chain under shape constraints, identifying a surface associated with the curve chain and optimizing the curve chain with under surface and distance constraints with respect to the identified surface. The method includes storing the graphic model with the optimized curve chain.

18 Claims, 7 Drawing Sheets

CURVE CHAIN CONNECTIONS UNDER SURFACE, DISTANCE, AND SHAPE CONSTRAINTS

TECHNICAL FIELD

The present disclosure is directed, in general, to computer-aided design, visualization, and manufacturing systems ("CAD systems"), product lifecycle management ("PLM") systems, project management systems, and systems that manage data for products and other items (individually and collectively, product data management ("PDM") systems).

BACKGROUND

CAD systems are used to design, model, and visualize objects, and such objects can be managed in PDM systems. Improved systems are desirable.

SUMMARY OF THE DISCLOSURE

Various disclosed embodiments relate to systems and methods for curve chain connection optimization under surface, distance, and shape constraints, and in particular in CAD and PDM systems configured to perform processes as described herein.

Various embodiments include PDM systems, methods, and mediums. A method includes receiving a graphic model having a plurality of curves forming a curve chain and defining a distance threshold and angle threshold corresponding to the model. The method includes optimizing the curve chain under shape constraints, identifying a surface associated with the curve chain and optimizing the curve chain with under surface and distance constraints with respect to the identified surface. The method includes storing the graphic model with the optimized curve chain.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
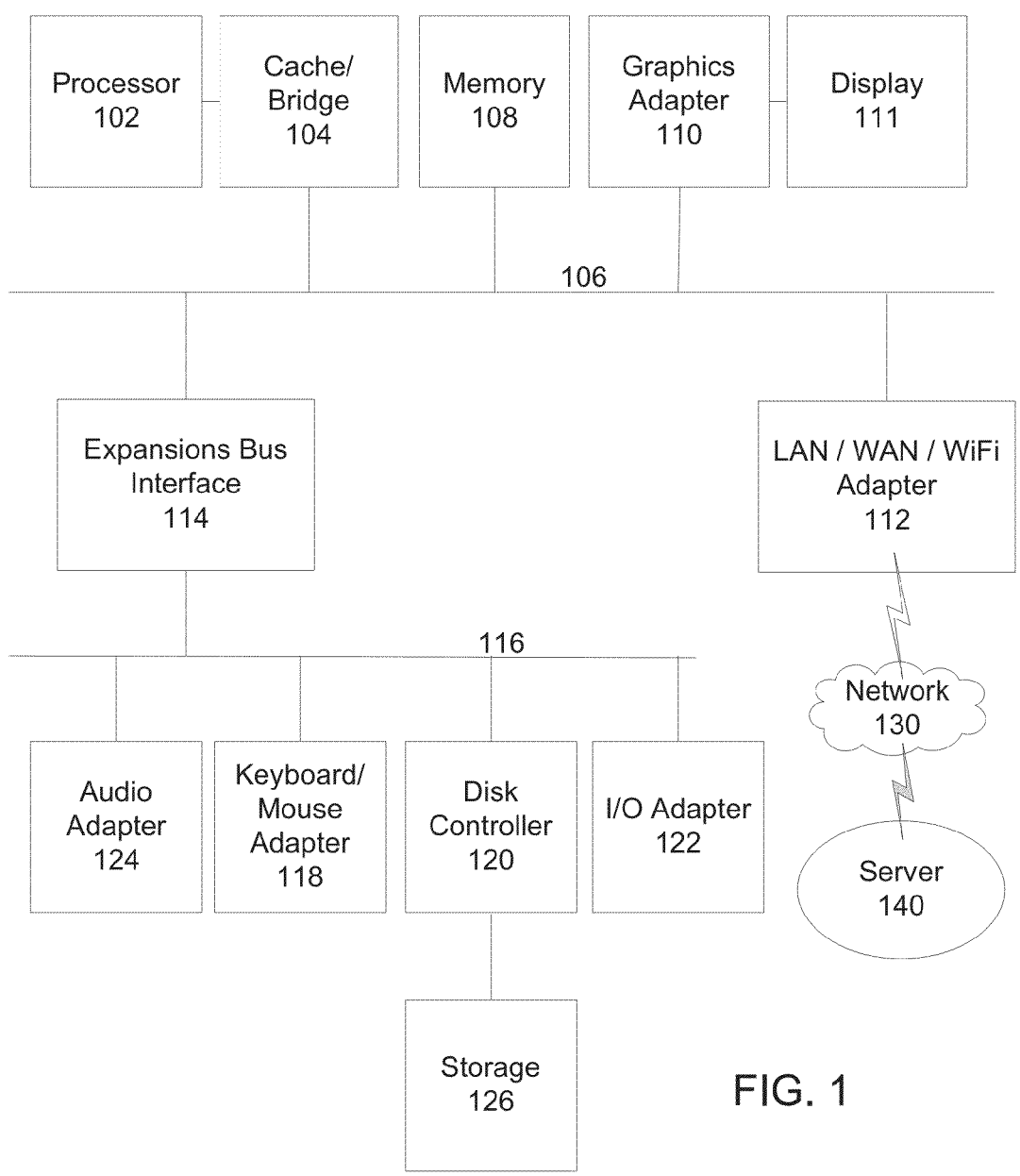
FIG. 1 depicts a block diagram of a data processing system in which an embodiment can be implemented in accordance with disclosed embodiments.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In any CAD system, dealing with coarse data can be a very time consuming job. Coarse data is inevitable for two reasons. First, for an open system that may use data from many different sources, the system must be able to work with imported data that may not be precise. The imported data is out of the control of the importing system and is usually very imprecise or otherwise "sloppy." Second, a CAD system that supports non-analytical geometry has to introduce tolerance. A tolerant gap may be minimized, but often cannot be eliminated or the cost to minimize it in every step of modeling is explosively high.

As long as such a gap exists, it may be amplified by subsequent operations such as by offsetting one feature from another. In such cases, a small gap or mismatch in the original model may result in a larger gap between the offset curves.

Thus, even for native data that starts with the accuracy within acceptable tolerance, after many steps the model may fall out of tolerance.

The coarse data problem in the morph process of product design is the gaps, overlaps, and misalignments in the connection of curve string, and these issues can be addressed by the techniques disclosed herein. For example, in a sloppy model, two curves could have a gap, other curves could overlap, other curves could misalign, and still other curves could have a small curve in between them.

Disclosed embodiments resolve such bad curve-curve connection problems and therefore reduce or eliminate the root cause of many downstream surface-building failures.

For purposes of the discussion herein, it may be helpful to describe certain continuity terms. G0 refers "point continuity", meaning that two curves touch each other. G1 refers to two curves that not only touch, but also go the same direction at the point where they touch. Mathematically, the first derivative of the two curves is equal at the point where they touch.

G2 adds the requirement that the curves not only go the same direction when they meet, but also have the same radius at that point. Mathematically, both the first and second derivatives of the equations are equal at that point.

G3 adds the requirement of planar acceleration. Curves that are G3 continuous touch, go the same direction, have the same radius, and that radius is accelerating at the same rate at a certain point. Mathematically, G3 continuous curves have equal third derivatives. Finally, G4 continuous curves have all the same requirements as G3 curves, but their curvature acceleration is equal in three dimensions.

Five levels of continuity are commonly used in CAD systems, as discussed above. With G0 continuity, the curves touch. In G1, the curves touch and go the same direction. With G2 continuity, the curves touch, go the same direction, and have equal radii at the contact point. With G3 continuity, the radii of the curves are equal and accelerating at the same rate, and with G4 continuity, the acceleration takes place in 3D space.

FIG. 1 depicts a block diagram of a data processing system in which an embodiment can be implemented, including as a CAD or PDM system particularly configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments provide systems and methods to correct "sloppy" or imprecise geometry problems, particularly in curve chains. According to disclosed embodiments, the system can automatically optimize curve chain connections under surface, distance, and shape constraints. A curve chain or curve string, as used herein, refers to two or more curves in a CAD model that connect (or are intended to connect) in an end-to-end fashion. Typical problems are described below.

For example, consider two curves that are intended to connect, but do not touch at all—they are neither G0 nor G1 continuous. This could be addressed by filling the G0/G1 gap by deforming the curves locally. However, this often results in too much local deformation, so that the shape of the curves at the connection is very bad. Attempting to simply deform the curves globally can cause problems since the curves will deviate from their original positions too much.

To properly cure this gap, the gap needs to be smoothened with a proper range so that it does not produce large local curvature, and in the meantime, does not alter the global curve shape too much. These two aspects are competing with each other. High precision on one side may mean low precision on the other side.

Another common problem occurs in three-dimensional (3D) modeling. In 3D space, when an operation is fully defined, the resulting geometry has the exact 3D location. For curve operations, the 3D location may be represented by three directional constraints.

For example, offsetting curves within face(s) has a curve direction constraint (no G0/G1 gap along curves), an on-surface constraint, and a distance constraint. As another example, projecting curves have a curve direction constraint (no G0/G1 gap along curves), an on-surface constraint, and a project direction constraint.

However, if the input surfaces have G0/G1 gap, there is no general mathematical solution for curves to satisfy all three constraints. Curing the curve direction G0/G1 gap means that trying to satisfy the other constraints will pull the curve back to the position with G0/G1 gap. There has to be a priority as to which constraint to satisfy first. The G0/G1 issue can have the highest priority, since otherwise the next step cannot always proceed. On-surface may have the next priority. The challenge is, while satisfying the G0/G1 constraints, to control the deviation from the other two constraints so that they do not exceed a tolerance for a G0/G1 gap.

If the input surfaces have no G0/G1 gap but the input curves have G0/G1 gap, there is chance to satisfy both G0/G1 and on-surface constraints, but not necessarily the third constraint. The challenge is similarly to fix G0/G1 gap while controlling the on-surface deviation.

If both the input surfaces and input curves have no G0/G1 gap, the system should be able to make the output curves satisfy all three constraints, but conventional attempts often distort the curves so that downstream processes can no longer use them due to tolerance stacking.

On other cases, there may be large gaps between curves that are well over the tolerance of a model that are meant to be gaps by design; these gaps should not be corrected. There may also be small gaps that are well within the tolerance of the model that may or may not need to be fixed. Disclosed embodiments can control whether a gap is fixed by the system using a default gap threshold within that the curves will be optimized. The system can also receive a user entry to adjust the threshold value.

Further, there are different places or steps during the model building in that curve optimization can be applied. For operations with curve string as input, the system will fix the curve gaps before the string is used. For operations that produce curve strings, the system will fix the curves after the operation. Some operations, such as curve projection and curve offset, take a curve string as input and output another curve string so the system applies optimization both before and after such an operation. Various embodiments can perform the corrections underlying the operation without requiring user's involvement, as described in more detail below.

Disclosed embodiments correct such sloppy or imprecise geometry by performing several processes to optimize the curve chain connections under surface, distance, and shape constraints. The system can optimize the curve under shape constraint, optimize the curve under surface and distance constraints, and finally perform a systematic and automated correction of the curve chain connections. The "system," as used herein, is a PDM data processing system as described above, such as a CAD data processing system.

Figure 2:
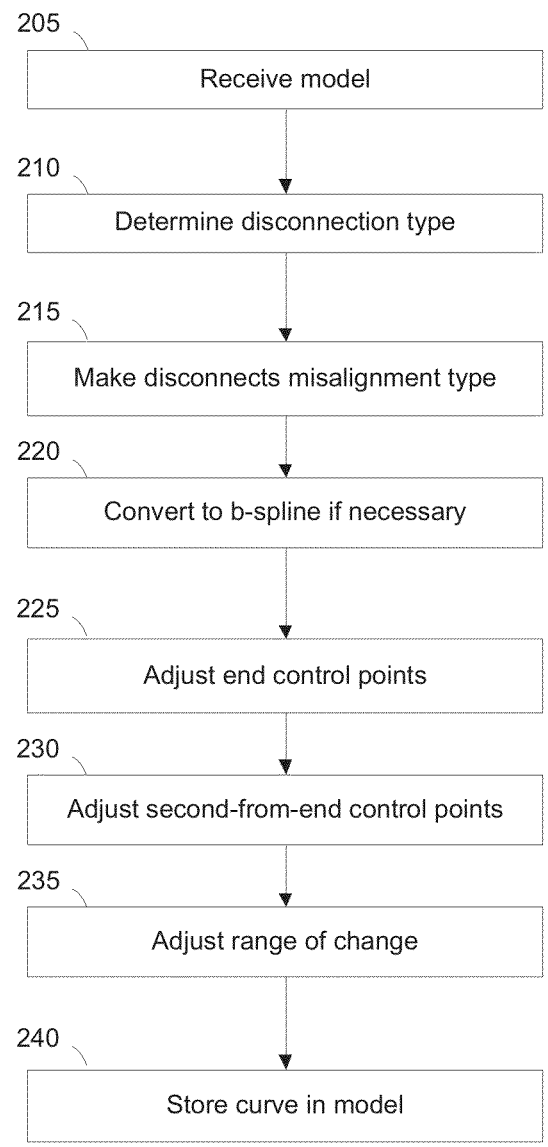
FIG. 2 depicts a flowchart of a process in accordance with disclosed embodiments.
Figure 3:
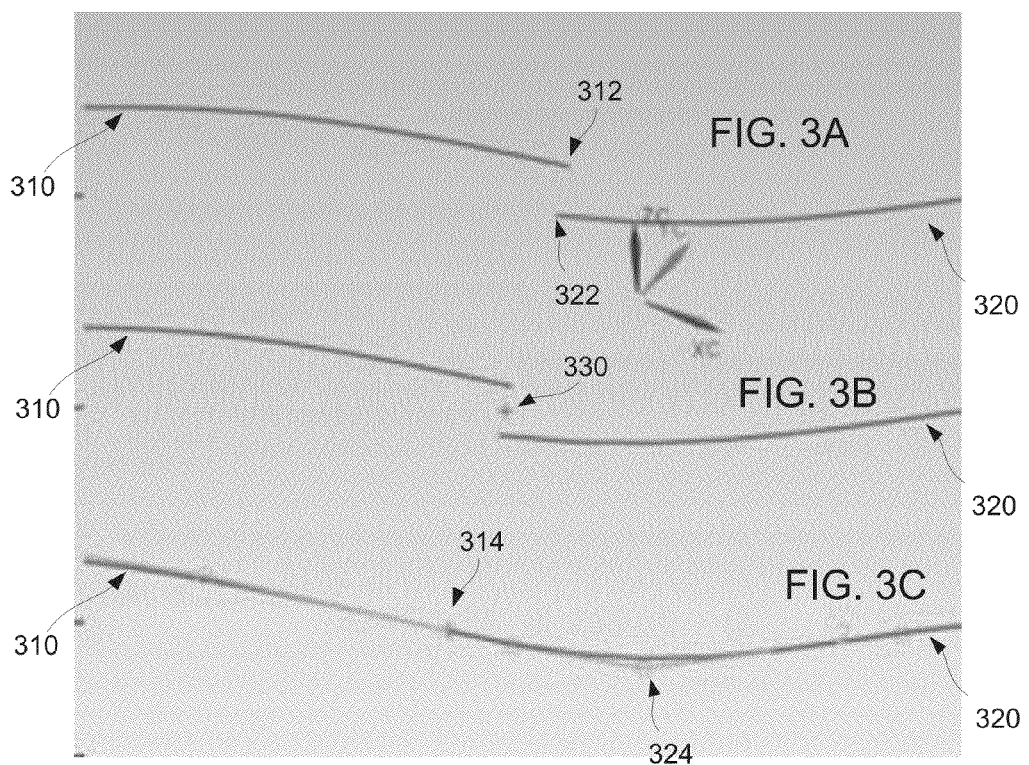
FIGS. 3A-3C illustrate a process to fix the discontinuity between two curves, in accordance with disclosed embodiments.

FIG. 2 depicts a flowchart of a process to optimize a curve under shape constraints; this process optimizes a curve string while preserving the curve shape.

The system receives a graphic model (step 205), if it does not already have an appropriate model with which to work. Receiving, as used herein, can include loading from storage, receiving from another device or process, receiving via an interaction with a user, or otherwise. In this process, the model has at least one curve string composed of at least two curves. A curve string can be composed of many curves. In a simple example, consider two curves that were G0/G1 disconnected. The objectives are to make them G0/G1 continuous, and in the meantime, to preserve the shape of the curves by keeping the new curves within the gap distance from the input curves, without introducing curvature disruption and fluctuation. The graphic model can include relevant shape, surface, and distance constraints as described herein, or these can be received from a user in a separate process.

In this process, the system determines the type of disconnection between the two curves in the curve chain (step 210). To do so, as a part of this step, the system first determines the minimum distance between the two curves, extended if necessary, near the curve ends, and the locations of the minimum distance points. The minimum distance should be less than or equal to the distance between the end points of the two curves.

If the minimum distance location is on an extension of the curve, the disconnection is a gap; that is, the two curves do not extend far enough to connect or overlap. If the location is within the curve, the disconnection is an overlap. If the location is at the curve ends and the distance is larger than 0, the disconnection is a misalignment.

The system adjusts the type of disconnection to a misalignment (if it is not a misalignment type already) (step 215). As part of this step, the system extends the curves to the minimum distance locations for the gap type, or trims the curves at the minimum distance locations for the overlap type; in either of these cases, the curves have new ends. At this point, the three types of disconnection have been unified to only the misalignment type. The processes described below assume that the disconnection is a misalignment type.

At this point, if the minimum distance is within the distance threshold defined by the system or user, the G0 discontinuity will be fixed. Further, the system can determine the angle between the tangent directions at the new curve ends, and if the angle is within the angle threshold, the G1 discontinuity will also be fixed at this point. In these cases, the process can end without completing further steps to refine the curves (not shown in figure).

FIGS. 3A-3C illustrate a process to fix the discontinuity between two curves 310 and 320. FIG. 3A shows curves 310 and 320 with a misalignment disconnect, where curve ends 312 and 322 have appropriate length so that the minimum distance between curves is at curve ends 312 and 322.

The system can convert each curve to a b-spline if it is not already a b-spline (step 220).

The system then adjusts the last control point of each b-spline curve, the end point of the curve, to a point in the middle of the two curve ends (step 225), as shown in FIG. 3B at point 330. This closes the G0 gap.

The system adjusts the next, second from the end, control point of each b-spline curve by projecting it to the gap angle bisector between the selected curves so that the curve tangency matches (step 230). These control points are shown in FIG. 3C at points 314 and 324. This closes the G1 gap.

Next, the system can adjust the range of the change to control the shape (step 235). To adjust the range, if the change of second control point (points 314 and 324 in the above example) is over the original gap (minimum distance), the change is too large.

In this case, the system can insert a control point between second control point and the end control point of each b-spline curve such that the change will be made on this control point and will be within the original gap. That is, instead of control point 314 and 324, a new control point can be inserted between these points and the end point of each line and can adjust these new control points instead.

To adjust the range, if the second control point is too close to the curve end compared to the original gap and consequently the curvature nearby can change abruptly or fluctuate, this control point is moved away from the curve end to smoothen the curvature. If needed, the third control point can be adjusted or the control point structure can be rearranged for the same reason. The change is controlled so that the optimized curve is still within the gap distance from the original curve.

The system can then store the optimized curve in the model (step 240). This process ensures G0 and G1 continuity between the curves in the curve chain.

Figure 4:
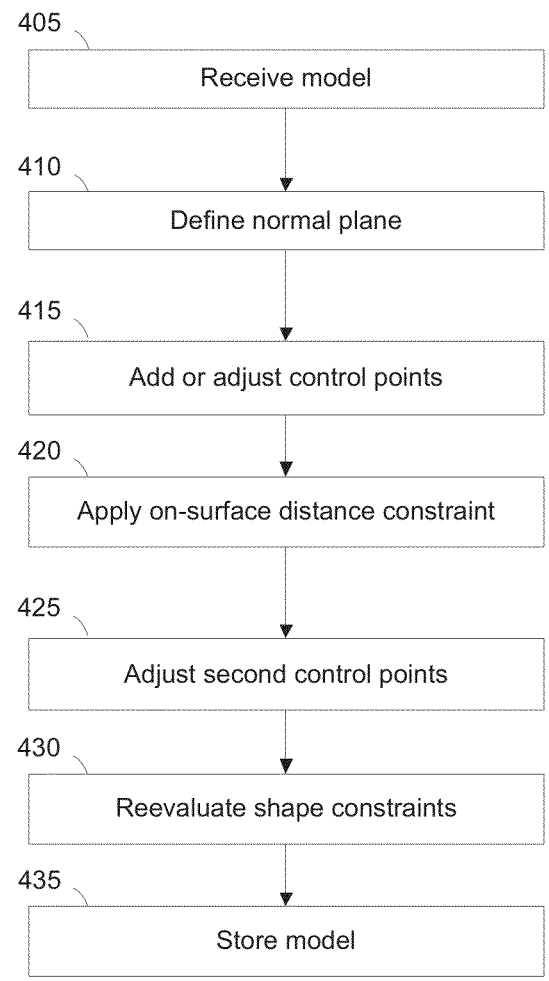
FIG. 4 depicts a flowchart of a process in accordance with disclosed embodiments.

FIG. 4 depicts a process to optimize a curve under surface and distance constraints; this process optimizes a curve string with constraints in the two directions other than the curve direction. The objectives of this process are to make the curves G0/G1 continuous; keep the new curves within the gap distance from the surfaces the input curves were on; and on the surfaces, keep the new curves within the gap distance from the defining positions of input curves. This process can be performed in addition to or in combination with the optimization with shape constraint process as described above. In various embodiments, for a chain of a plurality of input curves, the G0/G1 continuity of each curve connection can be first fixed as described above.

The system receives a graphic model (step 405) if it does not already have an appropriate model with which to work. In this process, the model includes a surface as well as a curve chain having a plurality of curves.

The surface constraint is applied when the input curve is on a surface of a model; of course, this only occurs when the model includes a surface. In a history-based modeling system, the surface knowledge is available through curve features. In systems that use imported models, the surface knowledge may be received by the system from user or the system can use known recognition techniques to determine the surface.

Given the surface, the system uses the surface normal at the curve ends to define the normal plane (step 410). These curves can be a selected two of the curves in the curve chain. As part of this step, the system can project second control points of the two curves to the normal plane rigidly as a virtual line connecting them, so that the two curves remain G1 continuous.

When the second control point adjustment is not enough, as described above, the system can add or adjust more control points until the surface constraint is satisfied within the gap distance (step 415).

If the surfaces underlying the two curves have different normal directions or even do not meet at the curve ends, such as when the input surfaces do not satisfy G0/G1 continuity, the system cannot satisfy both G0/G1 and surface constraints mathematically. In this case, the system uses the average normal of the two surface normals. The curve-curve G0/G1 constraint is still kept while the surface constraint is met to be within the scale of surface-surface deviation.

The system applies an on-surface distance constraint with respect to a defined location (step 420), when the curve has a defined location that is required by other constraints or requirements. The typical example is where the curve is projected onto surface and the curve is offset on the surface for some distance. The definition of other constraints or requirements must be given, either within the received model or as received by a use input. In history-based systems, these can be curve features so the requirements are always available. For imported models, when the system cannot efficiently "reverse engineer" the defining operation, the system can use the input curve as the reference for the optimized curve not to deviate over the gap distance.

Given the defining locations, the system can adjust the second control points of the two curves within the normal plane rigidly such that the curves will be as close to the defined locations as possible (step 425). This can be important for the system to ensure that it does not violate the G0/G1 and surface constraint. When the second control point adjustment is not enough, more control points are adjusted or new control points are inserted until the distance constraint is satisfied within the gap distance.

The system can then reevaluate and readjust the shape constraint if needed (step 430; repeating the process of FIG. 2). The system stores the updated model (step 435)

Figure 5:
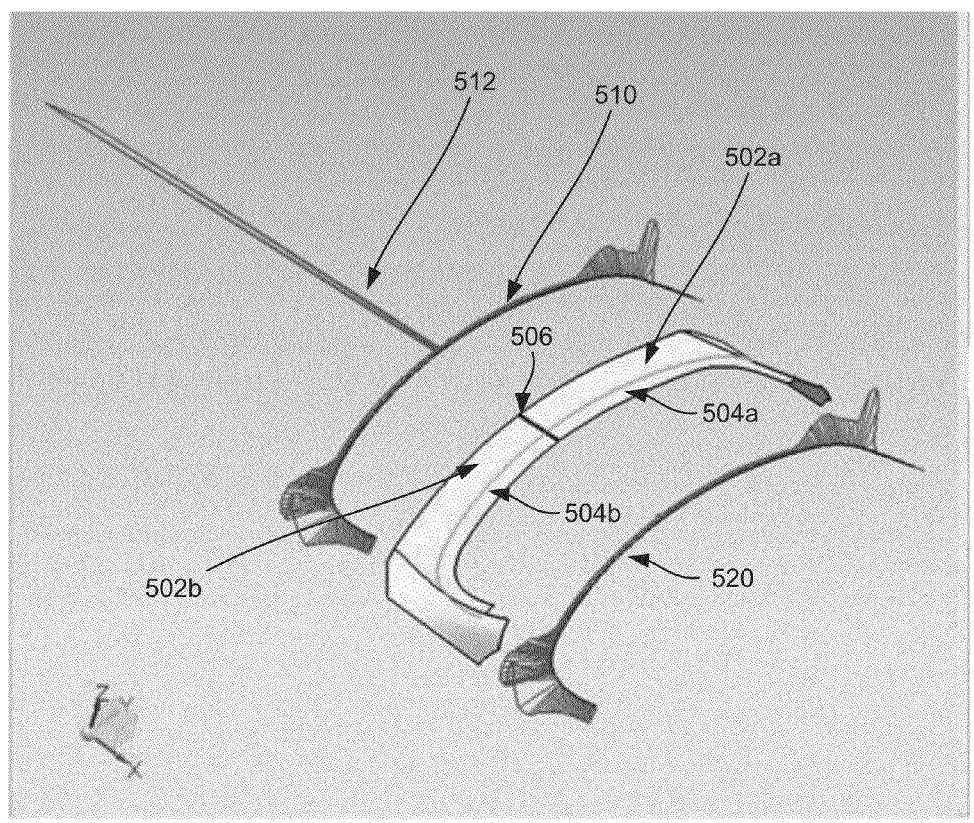
FIG. 5 illustrates an example of the results of a process to optimize curve with constraints, in accordance with disclosed embodiments.

FIG. 5 illustrates an example of the results of a process to optimize curves with constraints. The surface constrained curves, such as the intersection or projection curve, could yield undesirable results when crossing the topological boundaries. For example, in FIG. 5, surface 502a (with curve 504a on its surface) joins surface 502b (with curve 504b on its surface) at boundary 506, and curves 504a and 504b are intended to connect at boundary 506.

Before optimization as described herein, imprecise or sloppy geometry may prevent these surfaces and curves from properly connecting. Curvature combs 510 are shown here to illustrate such a disconnect at boundary 506.

A curvature comb can be used to illustrate curve smoothness by showing the normals at points along a curve as "teeth" in the comb, where the length of each tooth is proportional to the curvature (the inverse of radius) of the curve at that point. In curvature combs 510, illustrating G2 continuity, the disconnect causes a harsh transition between the flat and the highly curved geometry, and is shown as the jump in distance between the comb at the connection of the two curves and the comb adjacent to the connection curve. In this example, curves 504a and 504b on surfaces 502a and 502b generate a large curvature spike 512 in curvature combs 510, before optimization, at the boundary 506.

After optimization, not only the G0/G1 gap is fixed at boundary 506, the curvature transition is much smoother and the curves remain on surfaces with the correct gap size, as illustrated by curvature combs 520.

Figure 6:
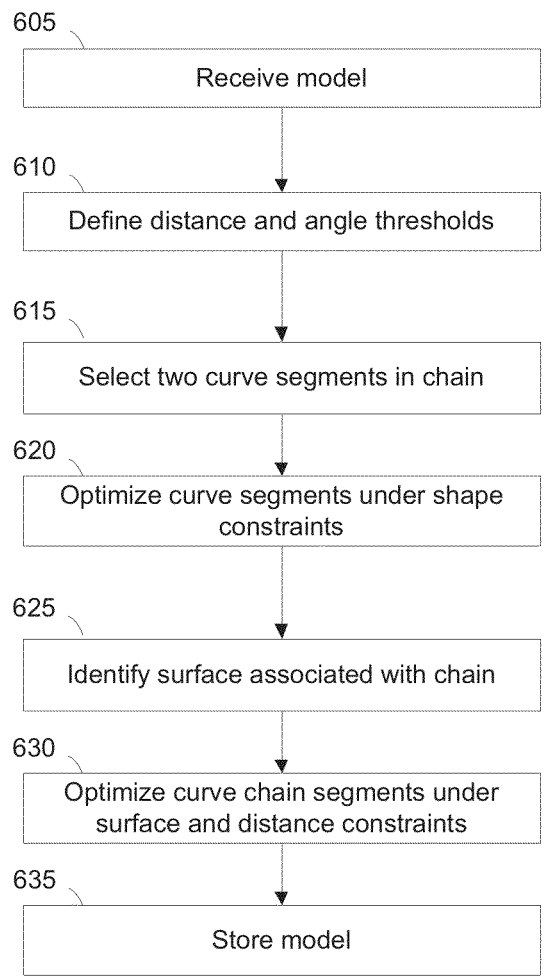
FIG. 6 depicts a flowchart of a process in accordance with disclosed embodiments.

FIG. 6 depicts a flowchart of a process for systematic automation of curve optimization. The system can apply the optimization on pairs of curves in a curve string, as described above, until all curves of the string are optimized. The process is can be invoked automatically by the system when it is needed during any step of model creation and editing.

The system receives a graphic model (step 605), if it does not already have an appropriate model with which to work. In this process, the model includes at least a curve chain having a plurality of curves and may also include a surface.

The system defines the distance threshold and angle threshold (step 610). In many practical implementations, the gaps or overlaps are usually much larger than the modeling tolerance specified by users, but are within five times of the modeling tolerance. In the meantime, a true disconnection between two curves has deviation much larger than five times of the tolerance. Thus, in various embodiments, five times the distance and angle tolerance are used as the default thresholds. In some embodiments, a global entry is provided to let user input the threshold value, and the system receives it from the user. Once the value is set, the system will use it through the whole workflow. Note the threshold is not an enlarged tolerance. If the gap is smaller than the threshold, the gap size is the actual value under which the surface and distance constraints are satisfied. Any operation can still use the modeling tolerance instead of the threshold value as the tolerance.

The system selects two curve segments in a curve chain of the model (step 615)

If and only if the minimum distance between any two curve segments in the input string is within the threshold, the optimization is applied to the two segments. If the length of a curve segment is smaller than the threshold, it is omitted and its two adjacent curve segments are treated as next to each other and selected for the optimization process.

If the two curves underlie two topologically connected edges of a B-rep body, namely the edges share a common vertex, no matter how big the curve gap is, the curves are meant to be connected thus are optimized. In the case that the input curves are the result of a feature in that the parent curves or surfaces are connected or underlie topologically connected entities, the curves are also optimized regardless of their gap size.

The system optimizes the curve chain under shape constraints (step 620). This can be performed as described with regard to the flowchart of FIG. 2 with respect to some or all curves in the curve chain.

The system can identify a surface of the model associated with the curve chain (step 625).

The system optimizes the curve chain under surface and distance constraints with respect to the identified surface (step 630). This can be performed as described with regard to the flowchart of FIG. 4 with respect to some or all curves in the curve chain.

The system stores the optimized model (step 635)

In modern CAD systems, a curve string is usually managed by a common module as a service. Features with curves as input take them as a string object. In some systems, this object is called a section. Curve optimization can be overloaded to the section. More specifically, the optimization can be applied to resulting curves after complex section building and the original connectivity information of the section is used to judge if the optimization should occur. Any feature with a section as the input can be optimized automatically as described herein.

Similarly, if a feature outputs a string of curves, an optimization process as described herein can be applied automatically on the resulting curves. The connectivity information of feature parents is naturally used to judge if the optimization should occur.

Figure 7:
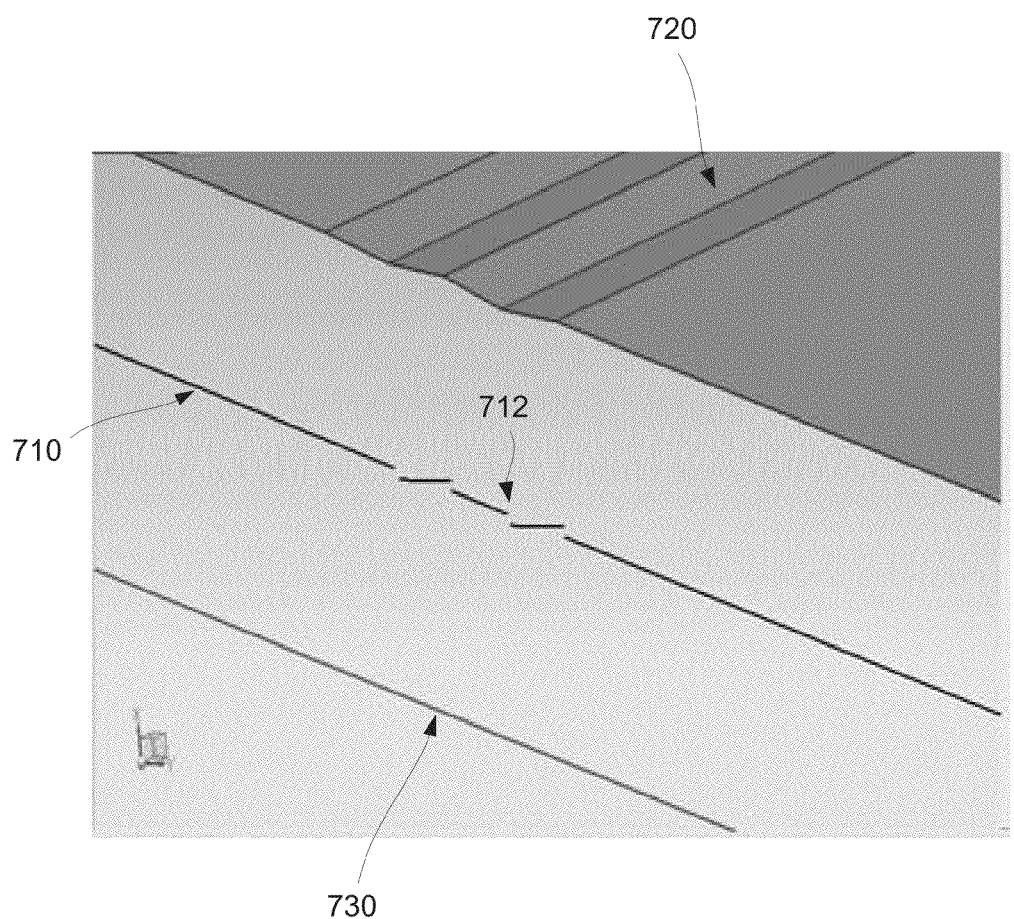
FIG. 7 illustrates an example showing the systematic curve string optimization in accordance with disclosed embodiments.

FIG. 7 illustrates an example showing the systematic curve string optimization. The extracted edges 710 from a sheet body 720 (of a tolerant model) have gaps and misalignments as shown at 712. They form a curve string as output of curve extraction and are used as input string for downstream operations. All the gaps and misalignments are removed automatically by optimization.

Unless otherwise described, the various processes, actions, and steps described above can be performed concurrently, sequentially, in a different order, omitted in various embodiments, or can be combined in other embodiments.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a product data management (PDM) data processing system, comprising:
   receiving a graphic model having a plurality of curves forming a curve chain;
   defining a distance threshold and angle threshold corresponding to the graphical model;
   optimizing the curve chain under shape constraints, including
      selecting two of the plurality of curves of the curve chain,
      adjusting a control point at a curve end of each of the selected curves to a point in the middle of the curve ends, and
      adjusting a second control point of each of the selected curves by projecting each second control point to a gap angle bisector between the selected curves;
   identifying a surface associated with the curve chain;
   optimizing the curve chain with under surface and distance constraints with respect to the identified surface; and
   storing the graphical model with the optimized curve chain.

2. The method of claim 1, wherein each of the curves is a b-spline curve.

3. The method of claim 1, wherein optimizing the curve chain under shape constraints ensures G0 and G1 continuity between the plurality of curves in the curve chain.

4. The method of claim 1, wherein each of the optimizing processes is performed for each of the curves in the curve chain.

5. The method of claim 1, wherein after optimizing the curve chain with under surface and distance constraints, the system optimizes the curve chain under shape constraints again.

6. A method performed by a product data management (PDM) data processing system, comprising:
   receiving a graphic model having a plurality of curves forming a curve chain;
   defining a distance threshold and angle threshold corresponding to the graphical model;
   optimizing the curve chain under shape constraints;
   identifying a surface associated with the curve chain;
   optimizing the curve chain with under surface and distance constraints with respect to the identified surface, including
      defining a normal plane corresponding to a surface normal at a curve end of two selected curves of the curve chain,
      projecting control points of each of the selected curves to the normal plane, applying an on-surface distance constraint with respect to a defined location, and adjusting a second control point of each of the selected curves within the normal plane so that the selected curves are as close as possible to the defined location; and storing the graphical model with the optimized curve chain.

7. A product data management (PDM) data processing system, comprising:

at least one processor; and an accessible memory, wherein the PDM data processing system is configured to:

receive a graphic model having a plurality of curves forming a curve chain;

define a distance threshold and angle threshold corresponding to the graphical model;

optimize the curve chain under shape constraints, including selecting two of the plurality of curves of the curve chain, adjusting a control point at a curve end of each of the selected curves to a point in the middle of the curve ends, and adjusting a second control point of each of the selected curves by projecting each second control point to a gap angle bisector between the selected curves;

identify a surface associated with the curve chain;

optimize the curve chain with under surface and distance constraints with respect to the identified surface; and store the graphical model with the optimized curve chain.

8. The PDM data processing system of claim 7, wherein each of the curves is a b-spline curve.

9. The PDM data processing system of claim 7, wherein optimizing the curve chain under shape constraints ensures G0 and G1 continuity between the plurality of curves in the curve chain.

10. The PDM data processing system of claim 7, wherein each of the optimizing processes is performed for each of the curves in the curve chain.

11. The PDM data processing system of claim 7, wherein after optimizing the curve chain with under surface and distance constraints, the system optimizes the curve chain under shape constraints again.

12. A product data management (PDM) data processing system, comprising:

at least one processor; and an accessible memory, wherein the PDM data processing system is configured to:

receive a graphic model having a plurality of curves forming a curve chain;

define a distance threshold and angle threshold corresponding to the graphical model;

optimize the curve chain under shape constraints;

identify a surface associated with the curve chain;

optimize the curve chain with under surface and distance constraints with respect to the identified surface, including defining a normal plane corresponding to a surface normal at a curve end of two selected curves of the curve chain, projecting control points of each of the selected curves to the normal plane, applying an on-surface distance constraint with respect to a defined location, and adjusting a second control point of each of the selected curves within the normal plane so that the selected curves are as close as possible to the defined location; and store the graphical model with the optimized curve chain.

13. A non-transitory computer-readable medium encoded with executable instructions that, when executed, cause a product data management (PDM) data processing system to:

receive a graphic model having a plurality of curves forming a curve chain;

define a distance threshold and angle threshold corresponding to the graphical model;

optimize the curve chain under shape constraints, including selecting two of the plurality of curves of the curve chain, adjusting a control point at a curve end of each of the selected curves to a point in the middle of the curve ends, and adjusting a second control point of each of the selected curves by projecting each second control point to a gap angle bisector between the selected curves;

identify a surface associated with the curve chain;

optimize the curve chain with under surface and distance constraints with respect to the identified surface; and store the graphical model with the optimized curve chain.

14. The computer-readable medium of claim 13, wherein each of the curves is a b-spline curve.

15. The computer-readable medium of claim 13, wherein optimizing the curve chain under shape constraints ensures G0 and G1 continuity between the plurality of curves in the curve chain.

16. The computer-readable medium of claim 13, wherein each of the optimizing processes is performed for each of the curves in the curve chain.

17. The computer-readable medium of claim 13, wherein after optimizing the curve chain with under surface and distance constraints, the system optimizes the curve chain under shape constraints again.

18. A non-transitory computer-readable medium encoded with executable instructions that, when executed, cause a product data management (PDM) data processing system to:

receive a graphic model having a plurality of curves foaming a curve chain;

define a distance threshold and angle threshold corresponding to the graphical model;

optimize the curve chain under shape constraints;

identify a surface associated with the curve chain;

optimize the curve chain with under surface and distance constraints with respect to the identified surface, including defining a normal plane corresponding to a surface normal at a curve end of two selected curves of the curve chain, projecting control points of each of the selected curves to the normal plane, applying an on-surface distance constraint with respect to a defined location, and adjusting a second control point of each of the selected curves within the normal plane so that the selected curves are as close as possible to the defined location; and store the graphical model with the optimized curve chain.

* * * * *